(12) United States Patent
Nguyen et al.

(10) Patent No.: US 7,116,011 B2
(45) Date of Patent: Oct. 3, 2006

(54) CPU SURGE REDUCTION AND PROTECTION

(75) Inventors: Don J. Nguyen, Portland, OR (US); Alex Waizman, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 10/331,944

(22) Filed: Dec. 31, 2002

(65) Prior Publication Data

US 2004/0125517 A1    Jul. 1, 2004

(51) Int. Cl.
*G05F 1/10* (2006.01)

(52) U.S. Cl. .............. 307/52; 307/59; 307/8; 307/103

(58) Field of Classification Search .............. 307/59, 307/52, 98, 103
See application file for complete search history.

(56) References Cited

U.S. PATENT DOCUMENTS

| 6,188,209 | B1 | 2/2001 | Poon et al. | 323/255 |
| 6,271,651 | B1 | 8/2001 | Stratakos et al. | 323/282 |
| 6,285,175 | B1 | 9/2001 | Massie | 323/290 |

*Primary Examiner*—Brian Sircus
*Assistant Examiner*—Hal I. Kaplan
(74) *Attorney, Agent, or Firm*—Samjay S. Gadkari (57) ABSTRACT

Methods and systems of providing power to a central processing unit (CPU) provide for enhanced surge protection and increased battery life. In one approach, an integrated circuit as a power output stage with an output node, and a voltage regulator coupled to the power output stage. The voltage regulator selectively switches the power output stage into a current ramp down mode based on detection of a voltage surge at the output node. The power output stage has an associated current ramp down rate. The CPU is coupled to the output node and a surge notification input of the power output stage, where the power output stage accelerates the current ramp down based on a notification signal from the CPU.

30 Claims, 5 Drawing Sheets

PRIOR ART

CPU SURGE REDUCTION AND PROTECTION

BACKGROUND

1. Technical Field

Embodiments of the present invention generally relate to the delivery of power to computer processors. More particularly, embodiments relate to the protection of computer processors from voltage surges on the occasion when the processor changes its current consumption from high current to low current.

2. Discussion

Mobile computing platforms such as laptop computers, or "notebook" computers, have become an integral part of modern society, and continue to grow in popularity. While the trend toward longer battery life, smaller platform size, and enhanced functionality is desirable to the consumer, it presents significant challenges to computer designers as well as manufacturers. A particular area of concern relates to the delivery of power to the central processing unit (CPU) of a mobile computing platform.

The battery life of a notebook computer is quantified as the ratio between the battery capacity and the average platform power consumption. Thus, reducing average platform power consumption increases the battery life and enhances the overall marketability of the mobile computing platform. As a result, an increasing amount of attention has been directed to developing techniques for reducing power consumption. It has been determined that portions of a typical CPU can be inactive for a relatively large percentage of the time, where applying the clock to these portions requires additional power. Typical approaches to reducing power consumption have therefore involved placing the CPU in a low-power state whenever practical by gating off the clock to unused portions of the CPU. Indeed, many notebook computer CPUs are designed with aggressive clock-gating technology.

When the unused portions of the CPU are gated off, the current demand by the CPU transitions from a relatively high value to a relatively low value, causing a condition commonly referred to as a high-to-low current consumption transient. Similarly, when the unused portions of the CPU are gated on, the current demand transitions from a relatively low value to a relatively high value, causing a condition commonly referred to as a low-to-high current consumption transient. The voltage that is supplied to the processor, however, should remain as constant as possible (staying within a tolerance window such as ±7.5%, for example) in order for the CPU to be able to function as designed. Unfortunately, the high-to-low current consumption transient tends to cause the processor voltage to surge and the low-to-high current consumption transient tends to cause the processor voltage to "droop". Furthermore, while the droop usually may result in CPU operation failure if the voltage drops below the specified limit, the surge in processor voltage constitutes a reliability degradation risk to the CPU that may manifest itself in CPU failure only after some time of operation under repetitive surges.

Figure 1:
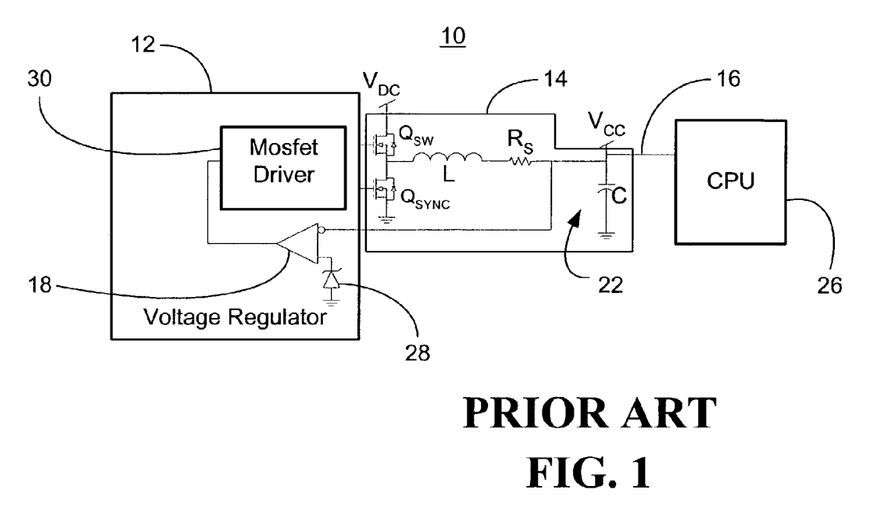
FIG. 1 is a circuit schematic of an example of an integrated circuit having a conventional power output stage.

Since the power conversion efficiency of the processor voltage is important in maintaining a low total platform power consumption and extending the platform's consumption and battery life, voltage regulation is typically designed to maximize power conversion efficiency. As such, notebook computers generally have switching voltage regulators instead of linear-mode voltage regulators due to the much higher power conversion efficiency of switching voltage regulators FIG. 1 shows a conventional approach to a circuit 10 that is used to regulate the voltage applied to a CPU 26 (i.e., $V_{cc}$). Generally, circuit 10 has a voltage regulator (VR) 12 and a power output stage 14 having an output node 16. The VR 12 switches the power output stage 14 into a current ramp down mode based on detection of a voltage surge at the output node 16. Similarly, the VR 12 switches the power output stage 14 into a current ramp up mode based on detection of a voltage droop at the output node 16.

Specifically, the voltage at output node 16 is compared to a reference voltage, which is set to the desired voltage level (for example, 1V) provided by a reference voltage component such as Zener diode 28, bandgap reference or any other means to generate accurate reference voltage. When the voltage at output node 16 is lower than the reference voltage, a comparator 18 generates a high signal, causing metal oxide semiconductor field effect transistor (MOSFET) driver 30 to turn on a switching transistor ($Q_{sw}$) in the power output stage 14. When $Q_{sw}$ is on, current in the output inductor (L), and through series current-sensing resistor $R_S$ ramps up. If the voltage at output 16 is greater than the reference voltage, comparator 18 outputs a low signal, causing MOSFET driver 30 to turn off $Q_{sw}$ and turn on a synchronization transistor ($Q_{SYNC}$). When $Q_{SYNC}$ is on, the current through the output inductor ramps down toward zero amps from a peak value. It should be noted that VR 12 has been simplified for discussion purposes and that inductor current ramping is a well-known phenomenon, described with the following equations.

$$v(t) = L \frac{di(t)}{dt} \quad \text{Equation 1}$$

According to Equation 1 the inductor ramp up rate is:

$$\frac{di(t)}{dt} = \frac{V_{DC} - V_{CC}}{L} \quad \text{Equation 2}$$

and the inductor ramp down rate is:

$$\frac{di(t)}{dt} = \frac{V_{CC}}{L} \quad \text{Equation 3}$$

Since the system voltage (e.g., $V_{DC}$) is typically on the order of 18 volts, and therefore much greater than the processor voltage, there is a much higher voltage across the output inductor during the ramp up mode than during the ramp down mode. As a result, the current ramp up rate through the inductor is substantially faster than that of the ramp down rate. Since the ramp down rate is relatively slow, the voltage surge at the output node 16 is typically greater than the voltage droop associated with the ramp up mode. The voltage surge can be estimated as follows, where $i_L$ (not shown in the figure) is the current through inductor L:

$$v_{SURGE}(t) = \frac{1}{C}\int (i_L - I_{CPU})dt + V_{ESR} \qquad \text{Equation 4}$$

Figure 2:
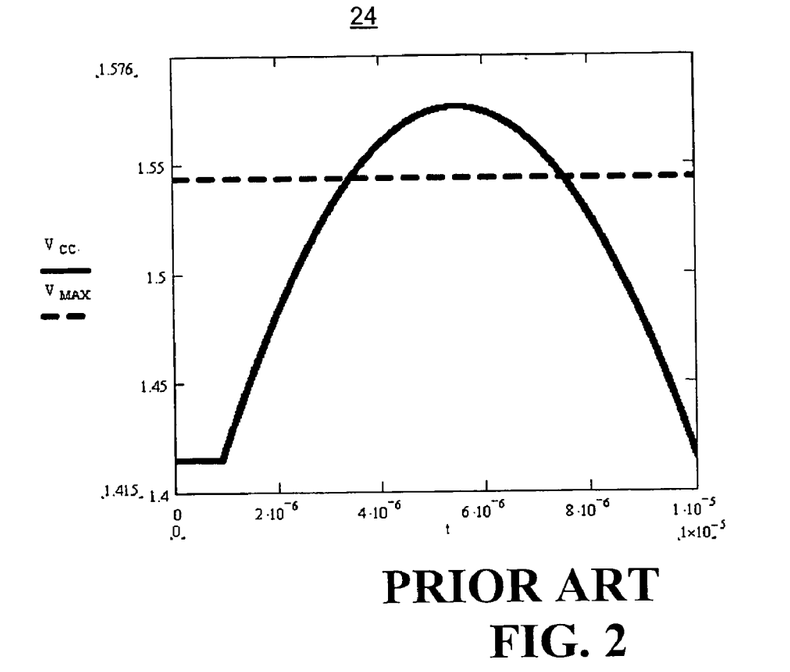
FIG. 2 is a plot of an example of a conventional voltage surge response curve.

Due to the tight space limitations associated with mobile computing platforms, output decoupling can be achieved by connecting small form-factor multi-layer ceramic capacitors (MLCC's) 22 to the output node 16. The MLCC 22 has a relatively small equivalent series resistance (ESR), but unfortunately have a relatively low capacitance. It can be shown from Equation 4 that by using MLCC 22 for output decoupling, that $V_{ESR}$, the initial voltage (not marked in the figure) across MLCC 22, is quite negligible. Due to the low capacitance, however, the voltage surge for MLCC 22 can be quite high since C appears in the denominator of Equation 4. FIG. 2 shows the estimated voltage surge for a conventional power output stage in plot 24, where a 200 nH output inductor is used. In the illustrated example, the voltage surge threshold ($V_{MAX}$) is exceeded due to the relatively slow ramp down rate.

One approach to reducing the voltage surge at the output node would be to reduce the inductance of the output inductor in order to increase the inductor ramp down current. There is a penalty to be paid, however, for such an approach. For example, as the inductance is reduced, there will be an increase in ripple current, which can cause an undesirably high output voltage ripple in addition to high magnetic loss in the inductor, which can result in lower power conversion efficiency. There is therefore a need to reduce the voltage surge associated with the current ramp down mode of a power output stage without negatively impacting output voltage ripple.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 3:
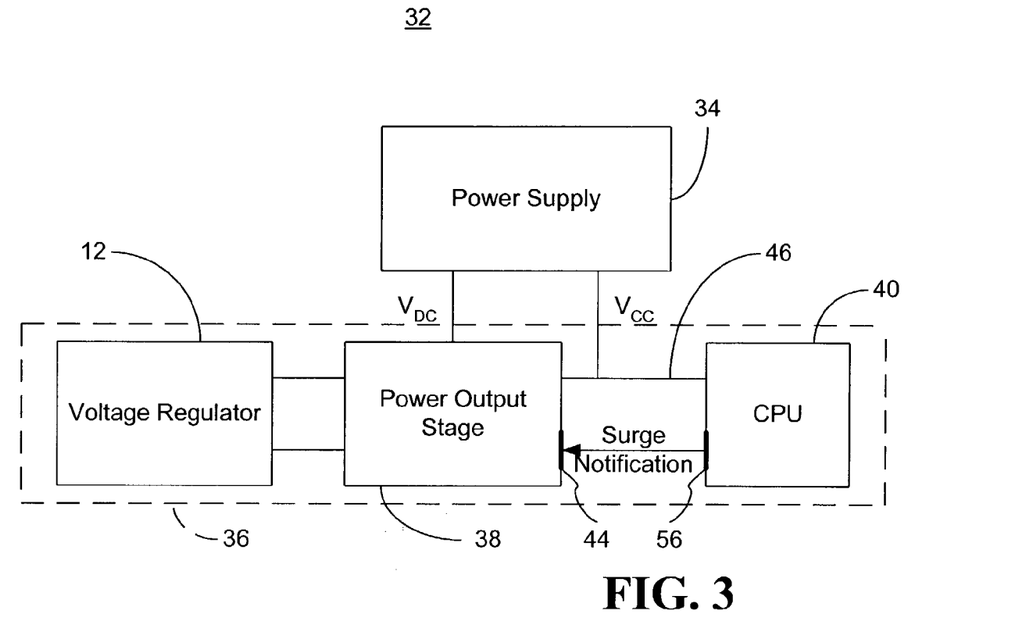
FIG. 3 is a block diagram of an example of a computer system having an integrated circuit according to one embodiment of the invention.

In the following description of the Drawings, the same reference characters refer to the same parts throughout the specification. FIG. 3 shows a computer system 32 having a power supply 34 and an integrated circuit 36. The computer system 32 can be part of a mobile computing platform such as a laptop computer. While IC 36 will be primarily described with regard to mobile computing platforms, embodiments of the invention are not so limited. Indeed, IC 36 can be used in any environment in which voltage surge is an issue of concern. Notwithstanding, there are a number of aspects of mobile computing platforms for which IC 36 is well suited.

Generally, the power supply 34 provides a system voltage ($V_{DC}$) and a processor voltage ($V_{CC}$), and has a conventional battery pack made up of a series of battery cells such as lithium ion battery cells. In one example, the battery cells combine to provide a system voltage on the order of 18 volts with respect to ground. The power supply 34 may also include an alternating current/direct current (AC/DC) adapter (not shown), which is capable of providing the system voltage.

The computer system 32 uses an improved IC 36 to increase the battery life associated with power supply 34 and protect CPU 40 from voltage surges. Specifically, IC 36 has a power output stage 38 and a voltage regulator 12 coupled to the power output stage 38. The term "coupled" is used herein to include any type of connection, direct or indirect, and includes but is not limited to connections that are electrical, optical, electromagnetic, mechanical, or any combination thereof. A surge notification output 56 of the CPU 40 is coupled to the power output stage 38, where the power output stage 38 receives the system voltage and has an output node 46 that receives the processor voltage. The voltage regulator 12 selectively switches the power output stage 38 into a current ramp down mode based on a voltage surge at output node 46 and into a current ramp up mode based on a voltage droop at output node 46. The CPU 40 is also coupled to a surge notification input 44 of the power output stage 38, where the power output stage 38 accelerates a current ramp down rate, which is associated with the current ramp down mode, based on a notification signal from the CPU 40. By accelerating the current ramp down rate in the presence of a switching voltage regulator, the power output stage 38 is able to reduce the negative effects of voltage surge without negatively impacting output voltage ripple.

Figure 4:
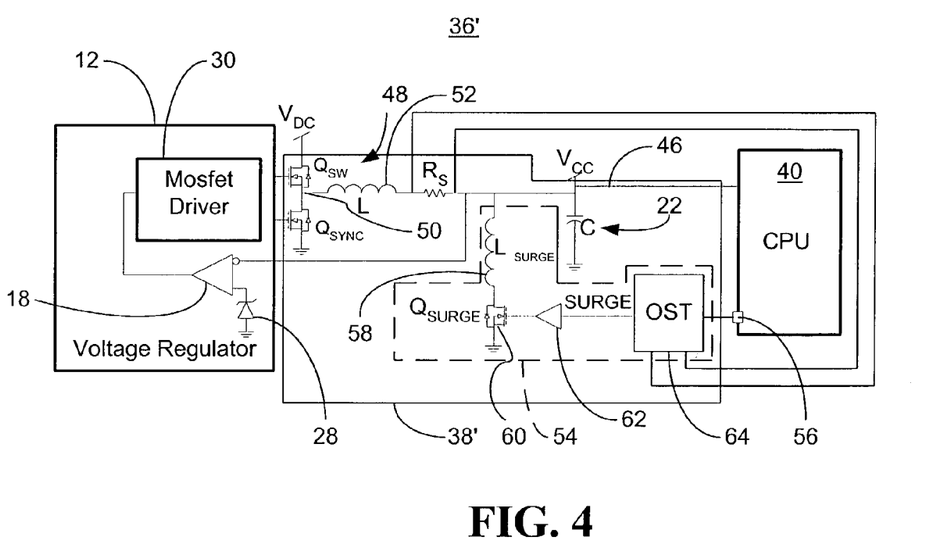
FIG. 4 is a schematic diagram of an example of an integrated circuit having a power output stage according to one embodiment of the invention.

Turning now to FIG. 4, one approach to an integrated circuit 36' is shown in greater detail. Specifically, a power output stage 38' has a transistor stack 48 coupled to the voltage regulator 12 and having a switching node 50. An output inductor 52 has a first terminal coupled to the switching node 50 of the transistor stack 48 and a second terminal coupled to the output node 46. The output inductor 52 defines a ramp down current path when the power output stage 38' is in the current ramp down mode, and defines a ramp up current path when the power output stage 38' is in the current ramp up mode. The power output stage 38' also has a transient adjustment circuit 54 coupled to the output node 46 and a surge notification output 56 of the CPU 40. The transient adjustment circuit 54 reduces an effective inductance of the ramp down current path in response to the surge notification signal from the CPU 40.

In the illustrated example, the transient adjustment circuit 54 has a surge inductor 58 with a first terminal coupled to the output node 46. A surge transistor 60 is coupled to a second terminal of the surge inductor 58 and the surge notification output 56. The surge transistor 60 switches the surge inductor 58 into a parallel connection with the output inductor 52 in response to the notification signal. By switching the surge inductor 58 into a parallel connection with the output inductor 52, the transient adjustment circuit 54 reduces the effective inductance of the ramp down current path of the power output stage 38'. The reduced effective inductance speeds up the rate at which the current supplied to the CPU 40 can decrease. As a result, the processor voltage is kept closer to its nominal value and the risk of damage to the CPU 40 is minimized.

In order to provide drive strength, the surge notification output 56 of the CPU 40 is coupled to the surge transistor 60 through a buffer 62. In addition, the second terminal of the output inductor 52 is coupled to the output node 46 through a sensing resistor ($R_s$), and the illustrated IC 36' further includes a one-shot timer (OST) 64. The OST 64 receives a level signal from the CPU 40 and converts the level signal into a pulse signal based on a ramp down current measurement obtained from the sensing resistor. SURGE is a one-shoot signal generated by the OSC block. It is logically-high long enough to reduce the surge voltage effect. The OST 64 can be implemented digitally or in analog using commercially available hardware and/or software techniques.

Thus, the notification signal can be a pulse signal having a pulse width that corresponds to the amount of current stored in the output inductor 52. If the current through the sensing resistor is relatively high, the width of the pulse signal will be wider and the surge transistor 60 will switch the surge inductor 58 into the parallel connection for a longer period of time. Conversely, if the current through the sensing resistor is relatively low, the width of the pulse signal will be narrower and the surge transistor 60 will switch the surge inductor 58 into the parallel connection with the output inductor 52 for a shorter period of time. It should be noted that although the OST 64 is shown as being a component of the power output stage 38', the OST 64 may alternatively be incorporated into the CPU 40, or into the voltage regulator 12 without parting from the spirit and scope of the embodiments of the invention. Decoupling capacitor (C) 22 has a terminal coupled to the output node 46 and smooths out the processor voltage.

Thus, the voltage regulator 12 is able to switch the power output stage 38' into a current ramp up mode based on a voltage droop at the output node 46, and into a current ramp down mode based on a voltage surge at the output surge at the output node 46. The current ramp up mode corresponds to the gating on of unused portions of the CPU and the ramp down corresponds to the gating off of unused portions of the CPU 40. Specifically, one approach to the voltage regulator 12 is to couple a metal oxide semiconductor field effect transistor (MOSFET) driver 30 to the power output stage 38', where a comparator 18 has a first input coupled to the output node 46 and a comparator output coupled to the MOSFET driver 30. A reference component such as Zener diode 28 applies a reference voltage to a second input of the comparator 18.

Figure 7:
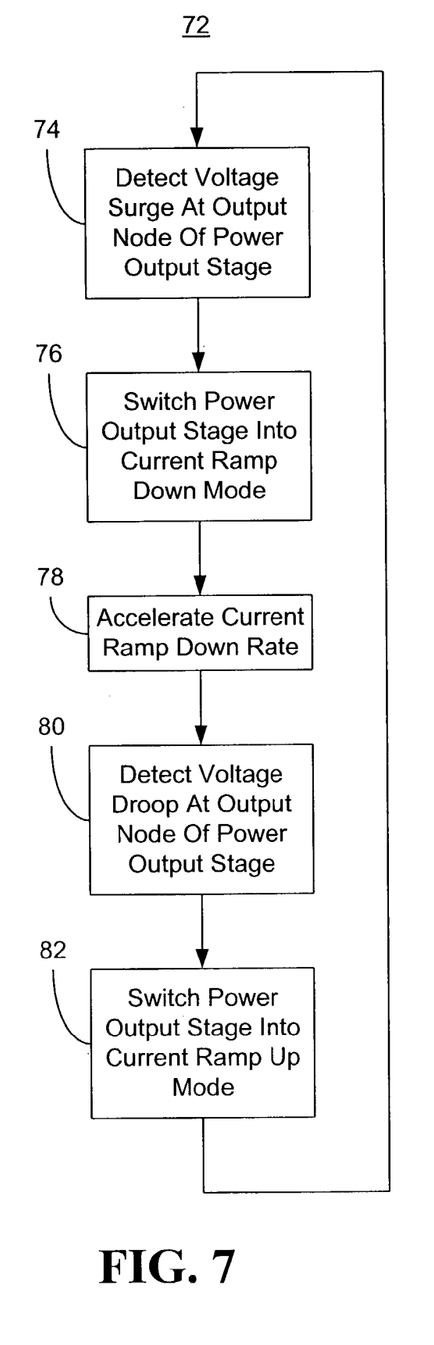

Turning now to FIG. 7, a method 72 of protecting a processor from voltage surges is shown. Processing block 74 provides for detecting a voltage surge at an output node of a power output stage. The power output stage is switched into a current ramp down mode at block 76 based on the voltage surge, where the power output stage has an associated current ramp down rate. Block 78 provides for accelerating the current ramp down rate based on a surge notification signal from the processor. It can further be seen that a voltage droop at the output node is detected at block 80 and the power output stage is switched into a current ramp up mode at block 82 based on the voltage droop. Thus, the current ramping rate is adjusted for the current ramp down mode and does not have to be adjusted for the current ramp up mode. This is due to the difference in transients for the two modes. Specifically, there is a much higher voltage across the output inductor during the current ramp up mode than in the current ramp down mode. As a result, the current ramp up rate is substantially faster than that of the current down rate.

Figure 8:
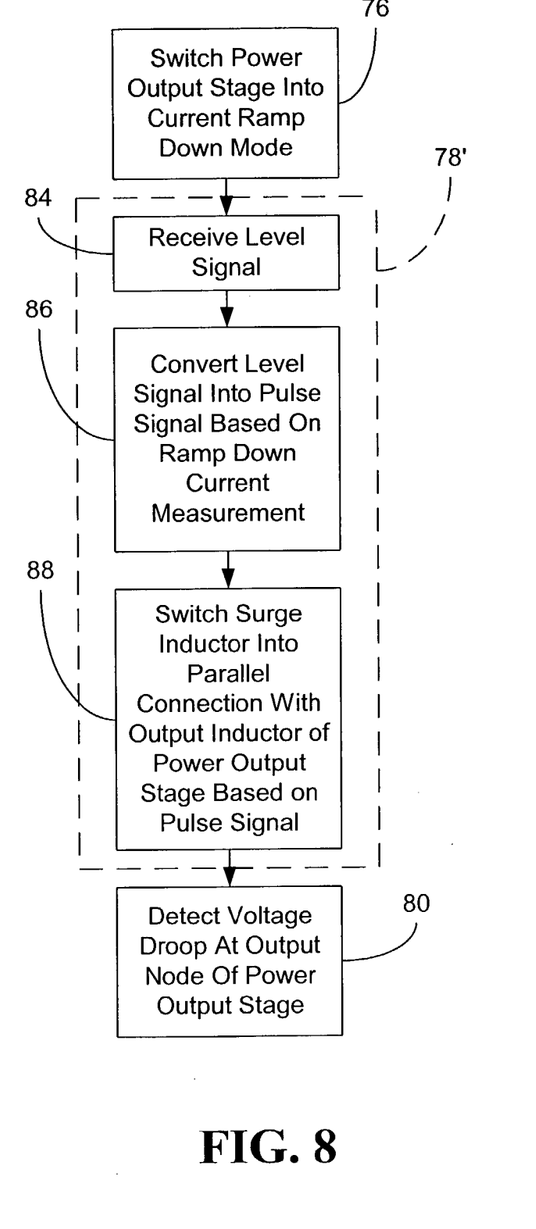

FIG. 8 is now considered. In the figure, one approach to accelerating the current ramp down rate is shown in greater detail at block 78. Specifically, block 84 provides for receiving a level signal, and block 86 provides for converting the level signal into a pulse signal based on a ramp down current measurement, which can be taken via the sensing resistor, $R_s$ (FIG. 4). The width of the pulse can be determined in other ways as well. A surge inductor is switched into a parallel connection with an output inductor of the power output stage at block 88 in order to reduce the effective inductance of the ramp down current path of the power output stage.

Figure 5:
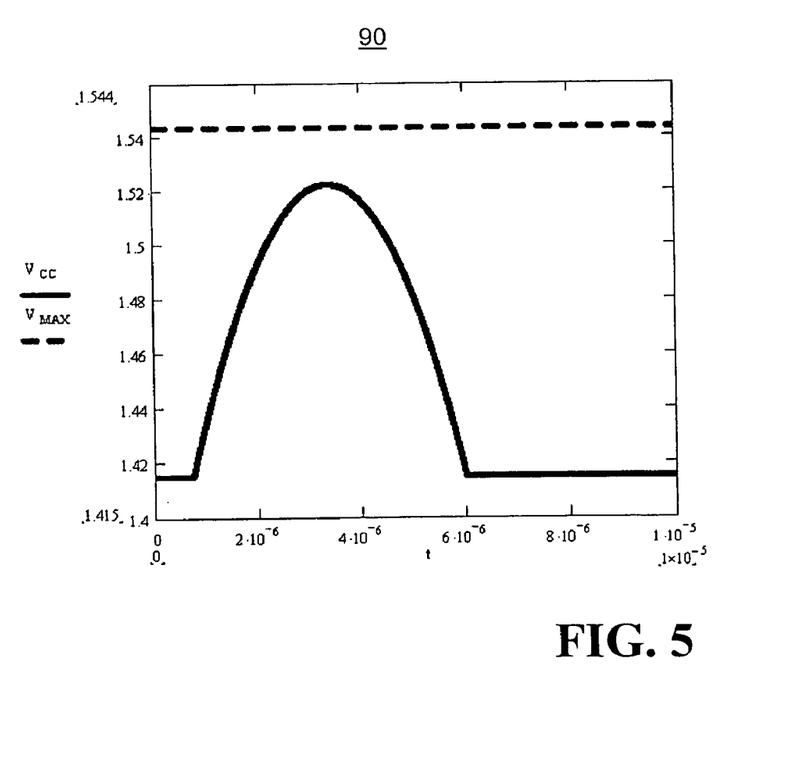
FIG. 5 is a plot of an example of voltage surge response curve according to one embodiment of the invention.
Figure 6:
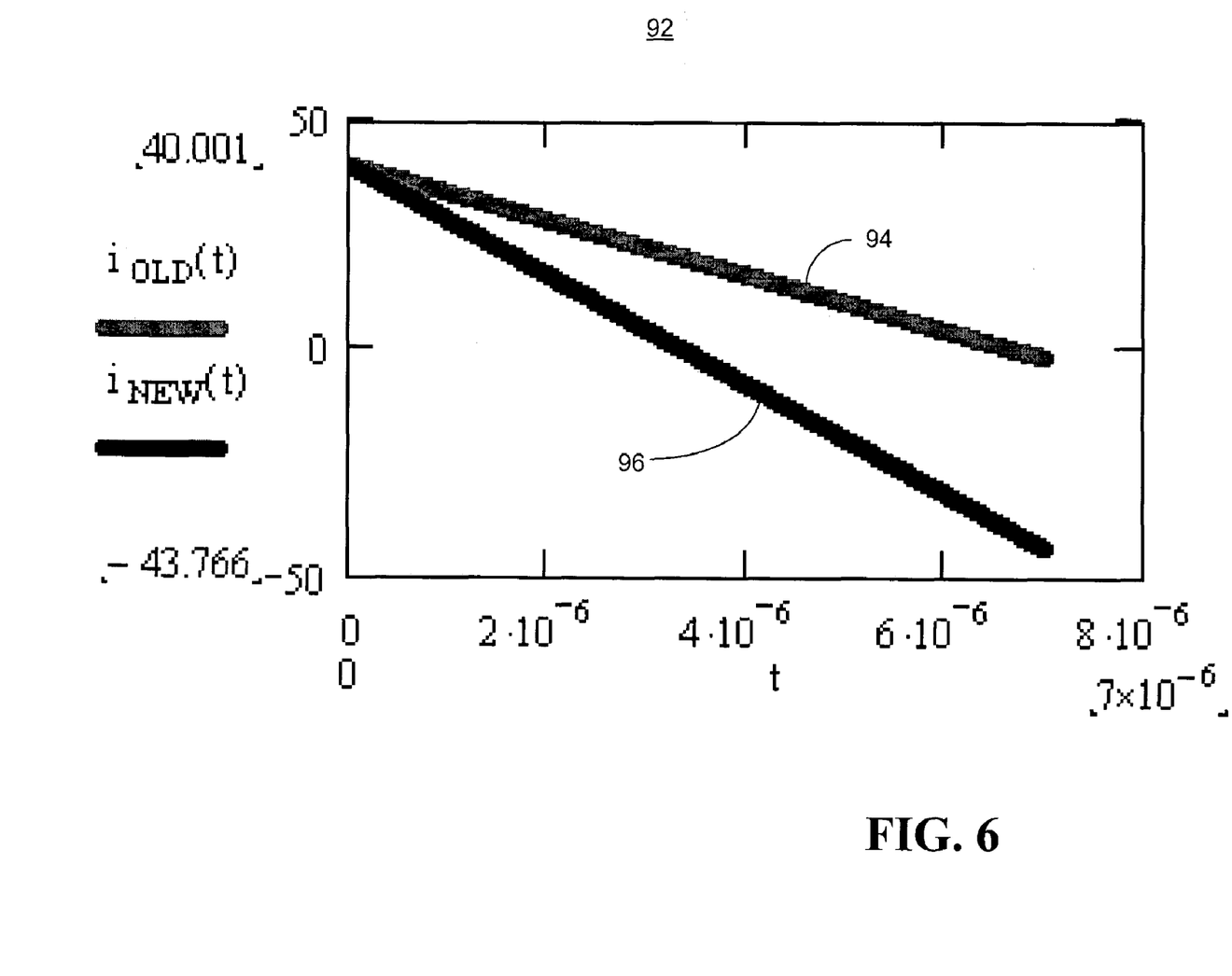
FIG. 6 is a graph of an example of a comparison between conventional ramp down and ramp down according to one embodiment of the invention.

FIG. 5 shows the estimated voltage surge for a power output stage having a transient adjustment circuit in plot 90. In the illustrated example, the voltage surge threshold ($V_{max}$) is not exceeded due to the increased current ramp down rate. This phenomenon is shown further in the plot 92 of FIG. 6 demonstrating a conventional current ramp down curve 94 in comparison to an accelerated current ramp down curve 96.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The invention claimed is:

1. A circuit comprising:
   a power output stage having an output node;
   a voltage regulator coupled to the power output stage, the voltage regulator to selectively switch the power output stage into a current ramp down mode based on detection of a voltage surge at the output node, the power output stage having an associated current ramp down rate; and
   a processor coupled to the output node and a surge notification input of the power output stage, the power output stage to accelerate the current ramp down rate based on a notification signal from the processor.

2. The circuit of claim 1 wherein the power output stage includes:
   a transistor stack coupled to the voltage regulator and having a switching node;
   an output inductor having a first terminal coupled to the switching node of the transistor stack and a second terminal coupled to the output node, the output inductor defining a ramp down current path of the power output stage; and
   a transient adjustment circuit coupled to the output node and a surge notification output of the processor, the transient adjustment circuit to reduce an effective inductance of the ramp down current path in response to the notification signal.

3. The circuit of claim 2 wherein the transient adjustment circuit includes:
   a surge inductor having a first terminal coupled to the output node; and
   a surge transistor coupled to a second terminal of the surge inductor and the surge notification output, the surge transistor to switch the surge inductor into a parallel connection with the output inductor in response to the notification signal.

4. The circuit of claim 3 wherein the surge notification output is coupled to the surge transistor through a buffer.

5. The circuit of claim 2 wherein the second terminal of the output inductor is coupled to the output node through a sensing resistor.

6. The circuit of claim 1 wherein the current ramp down mode is to correspond to a gating off of unused portions of the processor.

7. The circuit of claim 1 wherein the notification signal is a pulse signal.

8. The circuit of claim 7 further including a one shot timer coupled to the power output stage and the processor, the one shot timer to receive a level signal from the processor and convert the level signal into the pulse signal based on a ramp down current measurement.

9. The circuit of claim 1 wherein the power output stage is to be coupled to a system voltage and the output node is to be coupled to a processor voltage, the system voltage to be greater than the processor voltage relative to a ground.

10. The circuit of claim 1 further including an output capacitor having a terminal coupled to the output node.

11. The circuit of claim 1 wherein the voltage regulator is to switch the power output stage into a current ramp up mode based on a voltage droop at the output node.

12. The circuit of claim 11 wherein the current ramp up mode is to correspond to a gating on of unused portions of the processor.

13. The circuit of claim 11 wherein the voltage regulator includes:
a metal oxide semiconductor field effect transistor (MOSFET) driver coupled to the power output stage;
a comparator having a first input coupled to the output node and a comparator output coupled to the MOSFET driver; and
a reference component to apply a reference voltage to a second input of the comparator.

14. The circuit of claim 13 wherein the reference voltage component is a Zener diode.

15. A computer system comprising:
a power supply; and
a circuit, the circuit including a power output stage, a voltage regulator coupled to the power output stage, and a processor coupled to a surge notification input of the power output stage, the power output stage to receive a system voltage of the power supply and having an output node to receive a processor voltage of the power supply, the voltage regulator to selectively switch the power output stage into a current ramp down mode based on a voltage surge at the output node, the power output stage having an associated current ramp down rate, the power output stage to accelerate the current ramp down rate based on a notification signal from the processor.

16. The computer system of claim 15 wherein the power output stage includes:
a transistor stack coupled to the voltage regulator and having a switching node;
an output inductor having a first terminal coupled to the switching node of the transistor stack and a second terminal coupled to the output node, the output inductor defining a ramp down current path of the power output stage;
a transient adjustment circuit coupled to the output node, a ground of the power supply and a surge notification output of the processor, the transient adjustment circuit to reduce an effective inductance of the ramp down current path in response to the notification signal.

17. The computer system of claim 16 wherein the transient adjustment circuit includes:
a surge inductor having a first terminal coupled to the output node; and
a surge transistor coupled to a second terminal of the surge inductor and the surge notification output, the surge transistor to switch the surge inductor into a parallel connection with the output inductor in response to the notification signal.

18. The computer system of claim 17 wherein the surge notification output is coupled to the surge transistor through a buffer.

19. The computer system of claim 16 wherein the second terminal of the output inductor is coupled to the output node through a sensing resistor.

20. The computer system of claim 15 wherein the current ramp down mode is to correspond to a gating off of unused portions of the processor.

21. The computer system of claim 15 wherein the notification signal is a pulse signal.

22. A method of protecting a processor from voltage surges, comprising:
switching a power output stage into a current ramp down mode based on a voltage surge at an output node of the power output stage, the power output stage having an associated current ramp down rate; and
accelerating the current ramp down rate based on a surge notification signal from the processor.

23. The method of claim 22 further including reducing an effective inductance of a ramp down current path of the power output stage.

24. The method of claim 23 further including switching a surge inductor into a parallel connection with an output inductor of the power output stage.

25. The method of claim 22 further including generating a pulse signal based on the notification signal.

26. The method of claim 25 further including:
receiving a level signal; and
converting the level signal into the pulse signal based on a ramp down current measurement.

27. A power circuit comprising:
a power output stage, the power output stage including a transistor stack, an output inductor and a transient adjustment circuit, the transistor stack having a switching node, the output inductor defining a ramp down current path and having a first terminal coupled to the switching node and a second terminal coupled to an output node of the power output stage;
a voltage regulator coupled to the power output stage, the voltage regulator including a metal oxide semiconductor field effect transistor (MOSFET) driver, a comparator and a reference component, the MOSFET driver coupled to the transistor stack of the power output stage, the comparator having a first input coupled to the output node and a comparator output coupled to the MOSFET driver, the reference component to apply a reference voltage to a second input of the comparator;
a processor coupled to the output node and having a surge notification output coupled to a surge notification input of the transient adjustment circuit, the transient adjustment circuit to reduce an effective inductance of the ramp down current path in response to a surge notification signal from the processor, the notification signal to correspond to a gating off of unused portions of the processor.

28. The power circuit of claim 27 wherein the transient adjustment circuit includes:
- a surge inductor having a first terminal coupled to the output node; and
- a surge transistor coupled to a second terminal of the surge inductor and the surge notification output, the surge transistor to switch the surge inductor into a parallel connection with the output inductor in response to the notification signal.

29. The power circuit of claim 28 wherein the surge notification output is coupled to the surge transistor through a buffer.

30. The power circuit of claim 27 further including an output capacitor having a terminal coupled to the output node.

* * * * *